(12) United States Patent
Torrens-Figueroa

(10) Patent No.: US 11,785,958 B2
(45) Date of Patent: Oct. 17, 2023

(54) METHOD AND PROCESS FOR MAKING NATURAL CUT PORK CHOPS

(71) Applicant: Edgardo Torrens-Figueroa, Carolina, PR (US)

(72) Inventor: Edgardo Torrens-Figueroa, Carolina, PR (US)

(*) Notice: Subject to any disclaimer, the term of this patent is extended or adjusted under 35 U.S.C. 154(b) by 0 days.

(21) Appl. No.: 13/914,790

(22) Filed: Jun. 11, 2013

(65) Prior Publication Data

US 2014/0363547 A1 Dec. 11, 2014

(51) Int. Cl.
  *A22C 17/00* (2006.01)
  *A23L 13/00* (2016.01)
  *A23L 13/40* (2016.01)

(52) U.S. Cl.
  CPC ........ *A22C 17/004* (2013.01); *A22C 17/0006* (2013.01); *A23L 13/00* (2016.08); *A23L 13/428* (2016.08)

(58) Field of Classification Search
  None
  See application file for complete search history.

(56) References Cited

U.S. PATENT DOCUMENTS

| | | | | |
|---|---|---|---|---|
| 2,419,424 A * | 4/1947 | Staab | ............... | A22C 17/004 452/136 |
| 2,779,681 A * | 1/1957 | Sell | ............... | A23L 13/55 426/411 |
| 2,789,908 A * | 4/1957 | Doepken | ............... | A23B 4/044 426/315 |
| 2,980,537 A * | 4/1961 | Hagen | ............... | A23L 13/76 426/238 |
| 3,563,764 A * | 2/1971 | Posegate | ............... | 426/92 |
| 4,539,210 A * | 9/1985 | O'Connell et al. | ............... | 426/56 |
| 4,812,320 A * | 3/1989 | Ruzek | ............... | A23B 4/064 206/497 |
| 5,269,149 A * | 12/1993 | Zeidler | ............... | A23B 4/06 62/239 |
| 5,667,436 A * | 9/1997 | Gagliardi, Jr. | ............... | A22C 17/0006 452/135 |
| 6,559,431 B2 * | 5/2003 | Hopkins | ............... | 219/735 |
| 7,090,882 B2 * | 8/2006 | Koefod et al. | ............... | 426/326 |
| 2004/0194644 A1 * | 10/2004 | Backus | ............... | A23B 4/32 99/532 |
| 2009/0074939 A1 * | 3/2009 | Singh et al. | ............... | 426/647 |
| 2010/0292828 A1 * | 11/2010 | Einarsson | ............... | B07C 5/38 700/114 |

FOREIGN PATENT DOCUMENTS

FR 2530425 A1 * 1/1984 ........... A22C 7/0046

* cited by examiner

*Primary Examiner* — Viren A Thakur
*Assistant Examiner* — Thanh H Nguyen
(74) *Attorney, Agent, or Firm* — Michael C. Balaguy

(57) ABSTRACT

The present invention is a method for cutting pork to create a meat cut that mimics a pork chop meat. The method involves removing the bone and meat from the pork leg. The method then includes sealing the pork chop within a hermetic enclosure and chilling the enclosed pork chop to a temperature in the range of 35 to 38 degrees Fahrenheit. The resulting meat cut includes, bones or no bones pork chops.

2 Claims, 20 Drawing Sheets

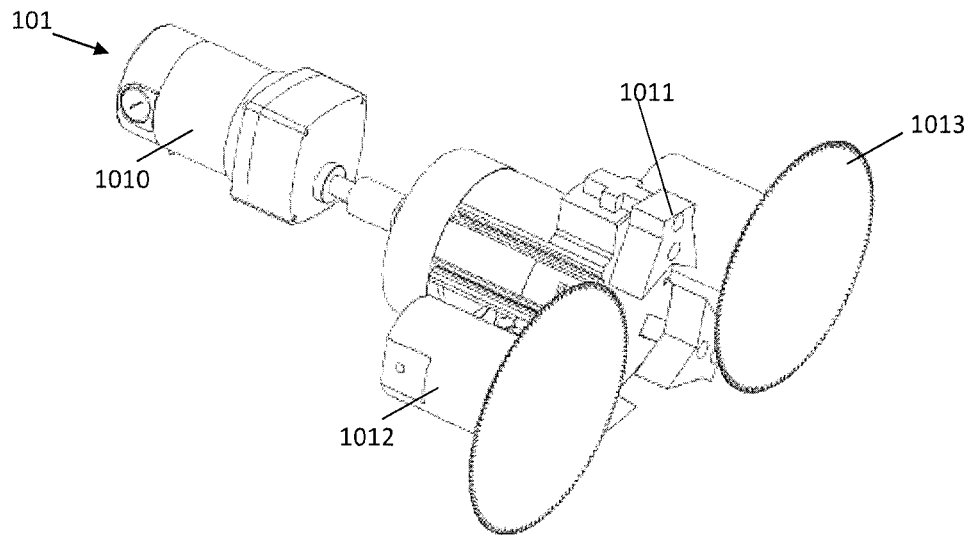
FIG. 5C
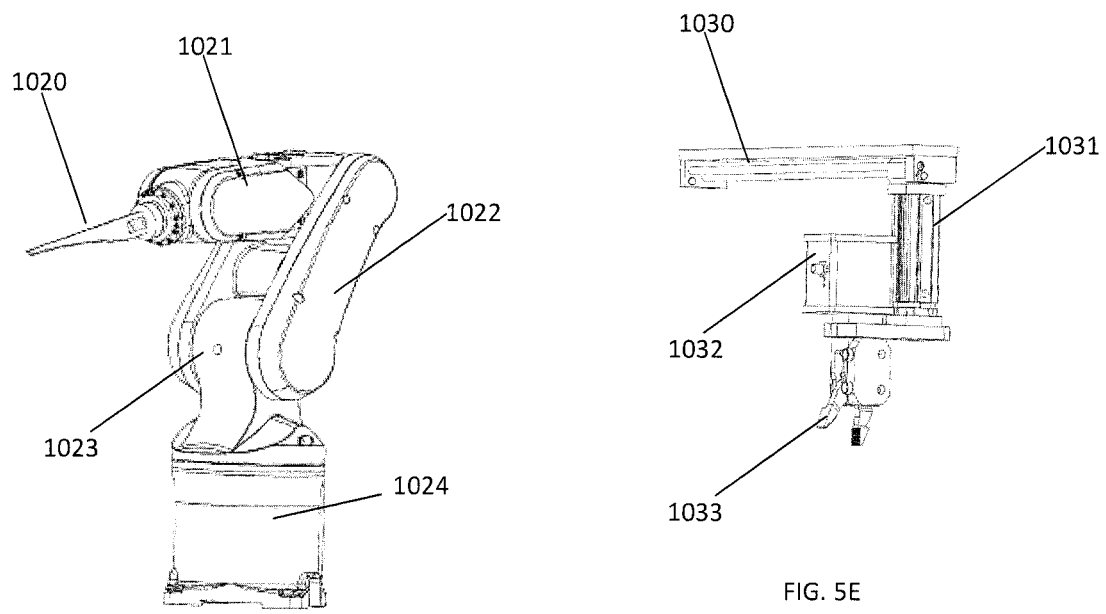
FIG. 5D
FIG. 5E

METHOD AND PROCESS FOR MAKING NATURAL CUT PORK CHOPS

RELATED APPLICATIONS

The current application claim the benefit of U.S. Provisional application 61/689,781 filed on Jun. 13, 2012.

STATEMENT REGARDING FEDERALLY SPONSORED RESEARCH AND DEVELOPMENT

N/A

BACKGROUND OF THE DISCLOSURE

1. Field of the Disclosure

The present invention generally relates to a method for forming a meat cut from a pork leg. In particular, the present invention relates to a method for forming a bone or boneless meat cut to create a final meat product that mimics a pork chops meat which includes pork skin and pork leg meat.

2. Discussion of the Background

In recent years, individuals have become increasingly interested in food products that are economical and attractive. There exist in the art methods to produce pork loin back ribs. Such examples produce a meat product that includes both bones and meat or a product made from restructured pork. A meat cut that includes both bones and meat makes it more difficult for a person to consume all available meat because the person must work around and between the bones. In addition, there exist in the art examples of methods for forming a meat cut from a center cut boneless pork loin. Such examples disclose a method that results in a boneless pork loin roast or a pork chop.

The present invention discloses a more efficient use of available meat on the pork leg. Also, the present invention discloses how to convert a pork leg cut to a more attractive and economically beneficial meat cut to achieve an end product that is more in demand.

SUMMARY

The present disclosure overcomes the limitations of the previous systems and methods for producing pork chops. Accordingly, it is an object of the present disclosure to provide a meat cut that mimics a pork chop meat, wherein the method involves removing the bone, fat, skin and meat from the pork leg. Further, uniformly treating and marinating the meat. The method then includes sealing the pork chop within a hermetic enclosure and chilling the enclosed pork chop.

It is another object of the present disclosure to provide a meat product that resembles a natural cut of flavored meat, more particularly a pork chop comprising meat, fat, skin and bones.

Another object of this disclosure is to provide a process for pork chops having reproducible uniformity as to permit its use in restaurants.

Further, another object of this disclosure is to provide a process for pork chops having reproducible uniformity as to permit its use in restaurants.

The disclosure itself, both as to its configuration and its mode of operation will be best understood, and additional objects and advantages thereof will become apparent, by the following detailed description of a preferred embodiment taken in conjunction with the accompanying drawings.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

BRIEF DESCRIPTION OF THE DRAWINGS

The accompanying drawings, which are incorporated herein, constitute part of the specification and illustrate the preferred embodiment of the disclosure.

FIG. 5A-5G. shows an exemplary embodiment of the process for removing pork leg skin and bones using a programmable machine in accordance with the principles of the present disclosure.

DESCRIPTION OF THE PREFERRED EMBODIMENT

Figure 1:
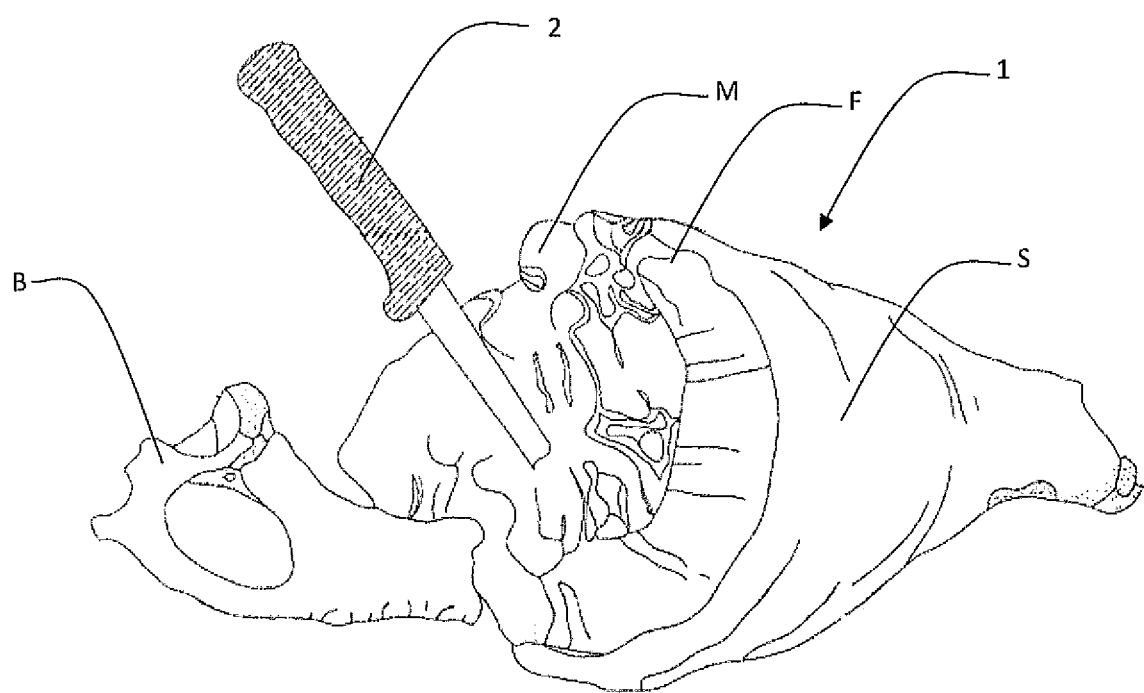
FIG. 1 shows a general structure of the pork leg in accordance with the principles of the present disclosure.

Referring to FIG. 1, discloses a pork leg 1, wherein said pork leg 1 comprises bones B, skin S, fat F and meat M.

Figures 2, 3:
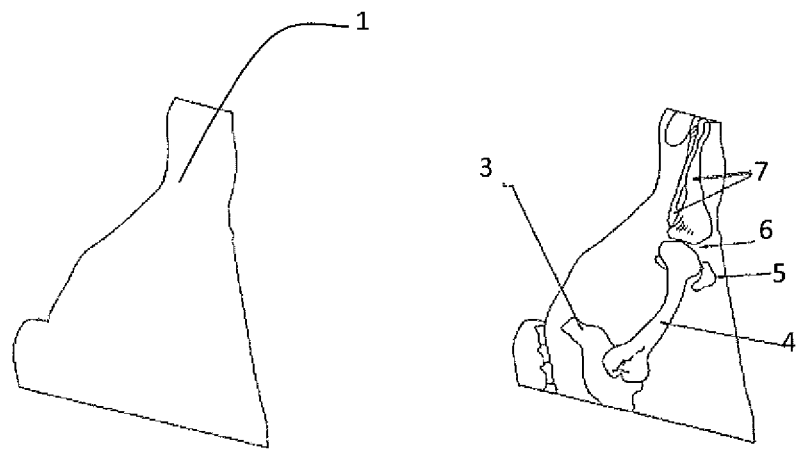
FIG. 2 shows side view of the pork leg in accordance with the principles of the present disclosure.
FIG. 3 shows an inner structure of the pork leg in accordance with the principles of the present disclosure.

Usually a knife 2 is used for removing the bones, skin, fat and meat of the pork leg 1. The pork leg is surrounded by skin S, as shown in FIG. 2 covering the bones, fat and meat. Therefore in order to remove the meat, bone and fat the skin has to be cut of and removed.

Further, as shown in FIG. 3, the pork leg 1 comprises several bones (3,4,5,6,7) that need to be removed. The followings are: aitch bone 3, leg bone 4, knee cap 5, stifle joint 6 and hind shank bones 7.

Figure 4:
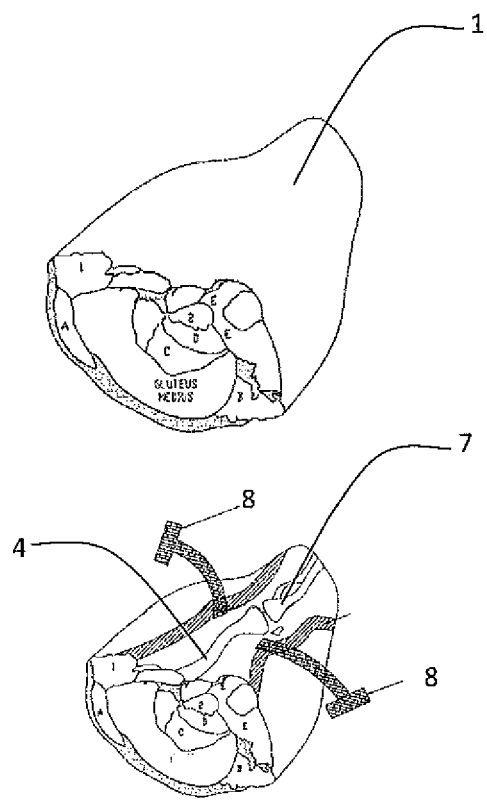
FIG. 4. shows an exemplary embodiment of the process for removing pork leg skin and bones in accordance with the principles of the present disclosure.

As mentioned above, the skin S is cut off and hooks 8 are used to open or created enough space to remove the bones B, as show in FIG. 4. The process is performed at a temperature in the range of 32 to 33 degrees Fahrenheit. Even when the process can be performed by an employed the present invention presents the option of using an automatic procedure wherein said skin, fat, bones and meat is removed by a programmable machine 100.

FIG. 5A through 5G are directed to the programmable machine 100. The programmable machine 100 comprises a frame 1000, a table assembly 104, a holder section 101, grasping element 103 and programmable cutter 102.

During the process of removing the bones from the pork leg 1, said pork leg 1 is positioned on top of table 104, wherein a holder section 101 avoids the unwanted horizontal displacement. The holder 101 is also capable of providing rotation upon the pork leg 1 on the horizontal axis, more particularly assisting the extraction of the bones. The holder comprises at least an actuator 1010, pressing means 1011 and a cutter. The cutter as shown in FIG. 5C comprises a saw motor 1012 and saw blades 1013. The wherein said pressing means 1011 are activated by the actuator 1010 in order to compress the pork leg 1 at a distal end. The pressing mean 1011 hold the pork leg 1 through the process of extracting bones.

The programmable cutter 102, as shown in FIG. 5D, is provided with a set of instructions in order to cut through the skin, based on several coordinates, and around the bones. The programmable cutter 102 comprises a base 1024, a blade 1020, a blade actuator 1021, pivot element 1023 and extendable arm 1022. The extendable arm 1022 is attached to the pivot element 1023 at a distal end, while the other distal end supports the blade actuator 1021. The extendable arm 1022 pivots around the pivot element 1023. The blade actuator 1021 holds the blade 1020 and generates the movement of the blade. The blade actuator 1021, extendable arm 1022 and base 1024 movement depend on the set of instructions.

Further ones the meat is separated from the bones by means of the programmable cutter 102 a grasping element 103 removes the bones. The grasping element, as shown in FIG. 5E, comprises at least a clamp 1033, a clamp actuator 1032, vertical trail 1031 and horizontal tray 1030. The clamp 1033, which is activated by the clamp actuator 1032, moves through vertical trail 1031 and horizontal trail 1030 by means of a linear motor and/or rotational motor in order to position the clamp closer to the bone to be removed.

Figure 5A:
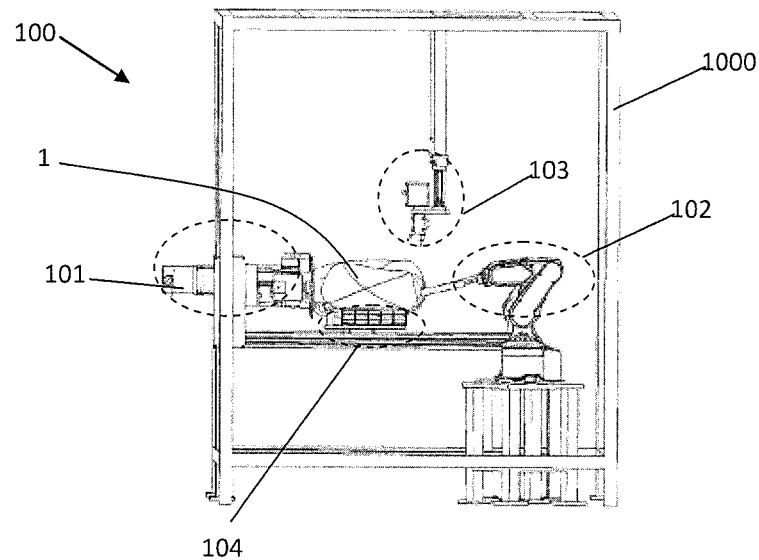
Figure 5B:
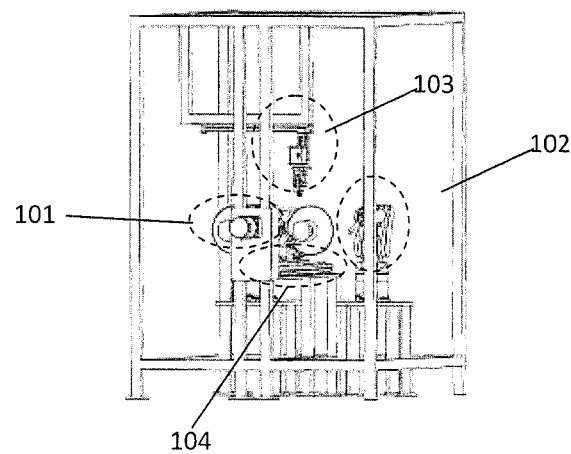
Figure 5F:
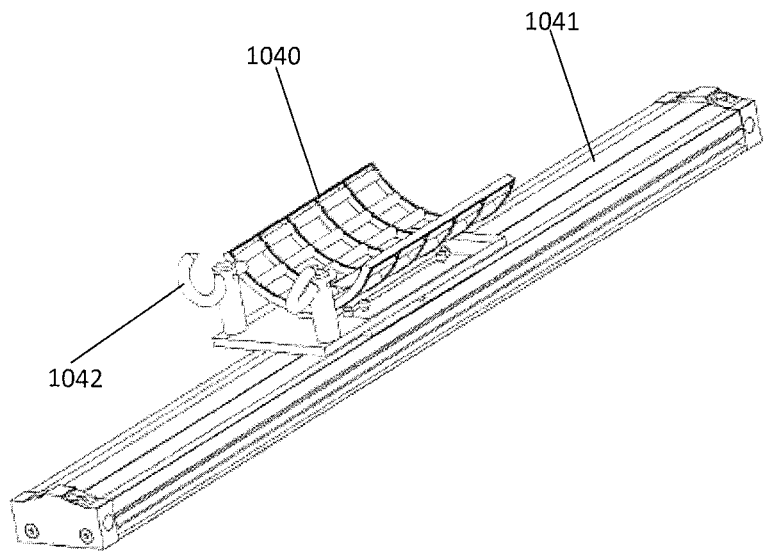
Figure 5G:
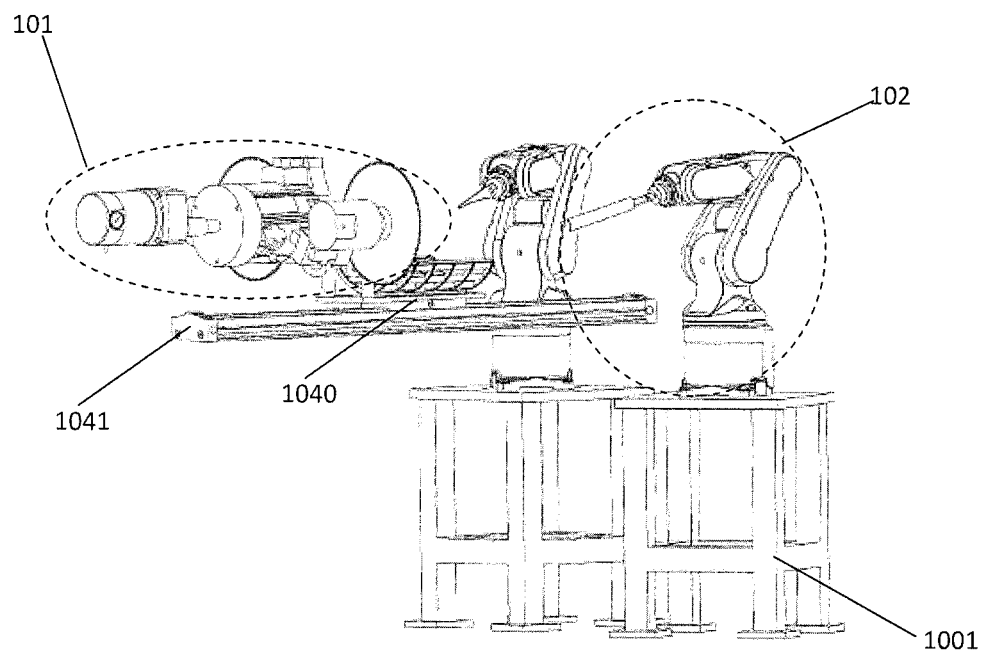
Figure 6A:
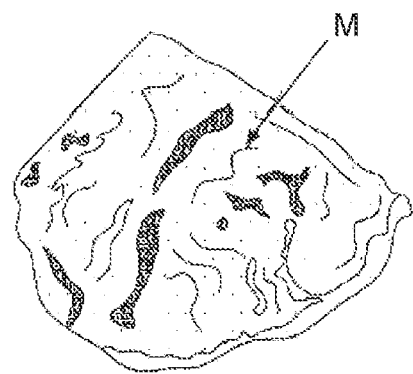
FIG. 6A-6D shows an exemplary embodiment of pork meat assembling in accordance with the principles of the present disclosure.
Figure 6B:
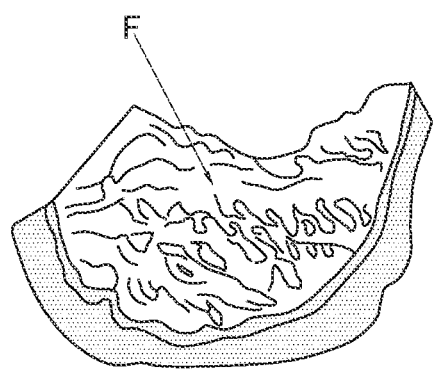
Figure 6C:
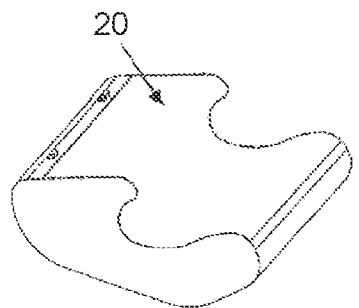
Figure 6D:
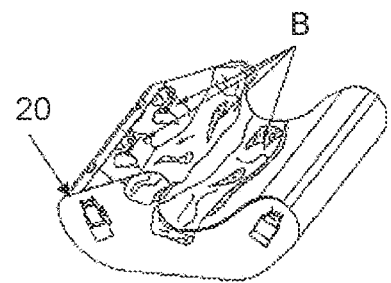

FIG. 5F is directed to the table assembly 104. The table assembly 104 comprises at least a table trail 1041, a hook 1042 and a table 1040. The hook 1042 holds the pork leg 1 on top of the table 1040, while the table trail 1041 provides enough area for the displacement of the pork leg during the process of removing the bones. The table 1040 moves on top of the table trail 1041 by means of a linear motor and/or rotational motor in order to position the clamp closer. FIG. 5G is more directed to the system with the frame, wherein the programmable cutter 102 are located on top of supporter 1001. The table trail 1041 and 101 holder section 101 are adjusted to the frame 1001.

The programmable machine 100 may comprise more than one programmable cutter 102 in order to remove bones. A conveyer (not show) is located under the table 104 in order to transport the skin, fat and meat to a flavor addition process after the bones are removed. The table 104 is tilted, after the bones are removed, to push the residual the skin, fat and meat to the conveyer. After the injection of flavors the conveyer directs the skin, fat and meat to a process wherein the skin, fat and meat might be separated.

As mentioned, the skin, fat and meat is injected with flavors or marinated with a uniform compound assisting to create a meat product, such as pork chop, having reproducible uniformity as to permit its use in restaurants. Further the uniform compound which comprises several natural spices assist with killing germs and/or bacteria.

Further the removed skin, bones, fat and meat are sealed within a hermetic enclosure or mold 20. FIG. 6A through 6D are directed to the process of encapsulating the skin, bones, fat and meat in a mold 20.

Figure 7:
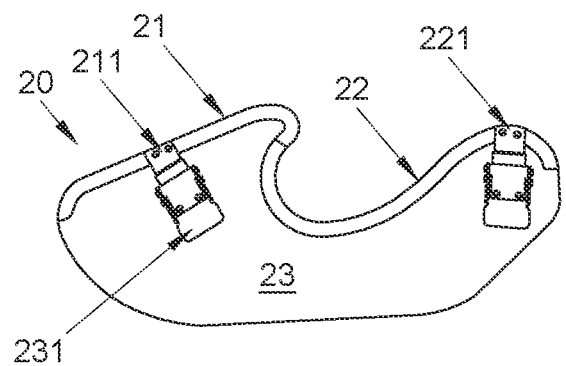
FIG. 7. shows an exemplary embodiment of the pork chop mold product in accordance with the principles of the present disclosure.
Figure 8B:
FIGS. 8A-8B. shows an exemplary embodiment of the pork chop mold main body in accordance with the principles of the present disclosure.
Figure 8A:
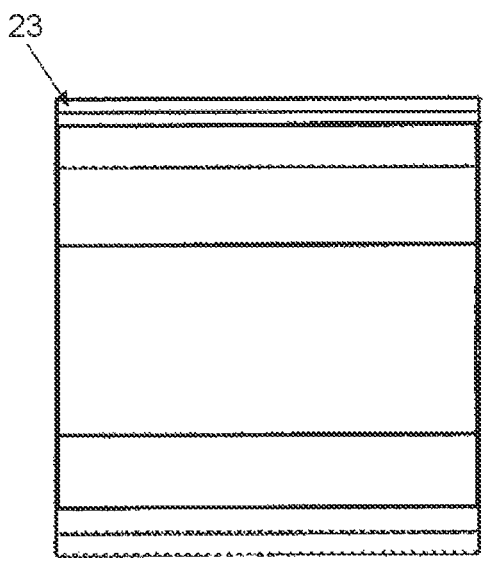
Figure 9A:
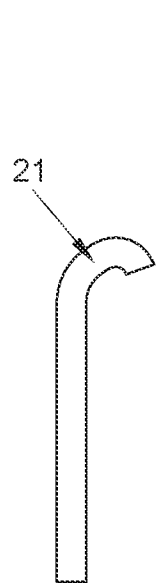
FIGS. 9A-9B. shows an exemplary embodiment of the pork chop mold top body in accordance with the principles of the present disclosure.
Figure 10A:
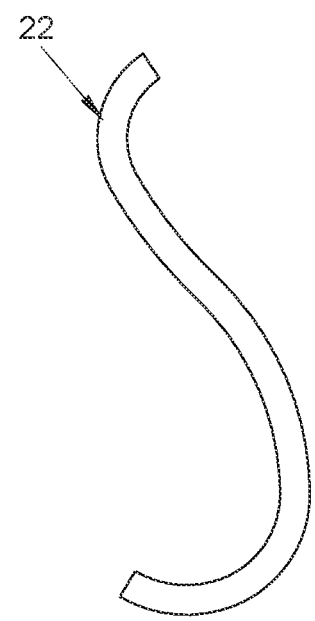
FIGS. 10A-10B. shows an exemplary embodiment of the pork chop mold center body in accordance with the principles of the present disclosure.
Figure 9B:
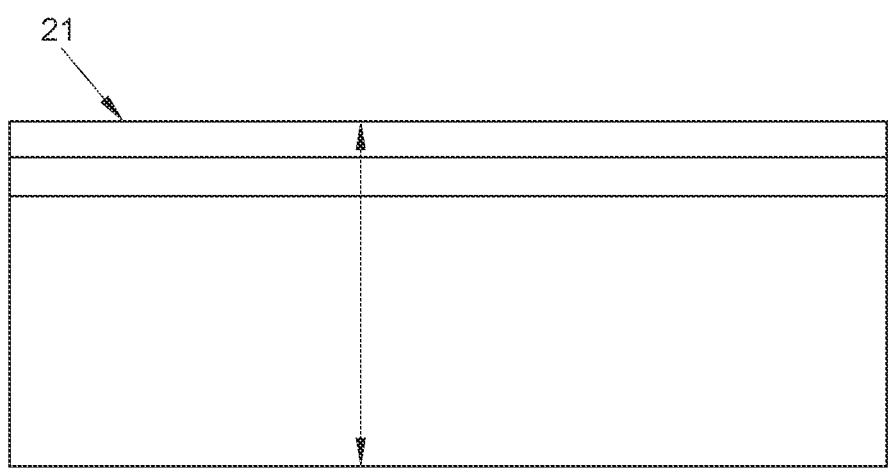
Figure 10B:
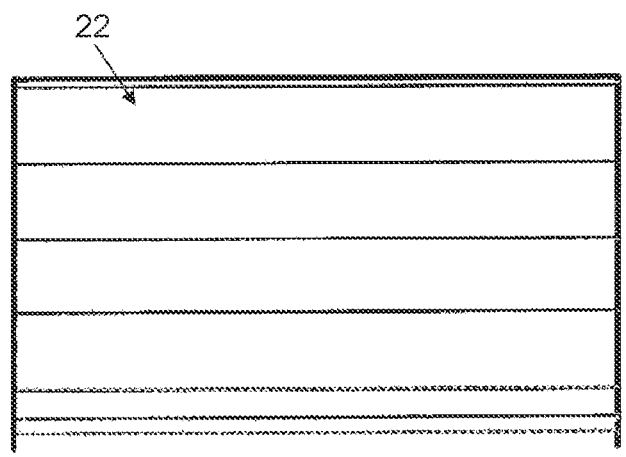
Figure 11:
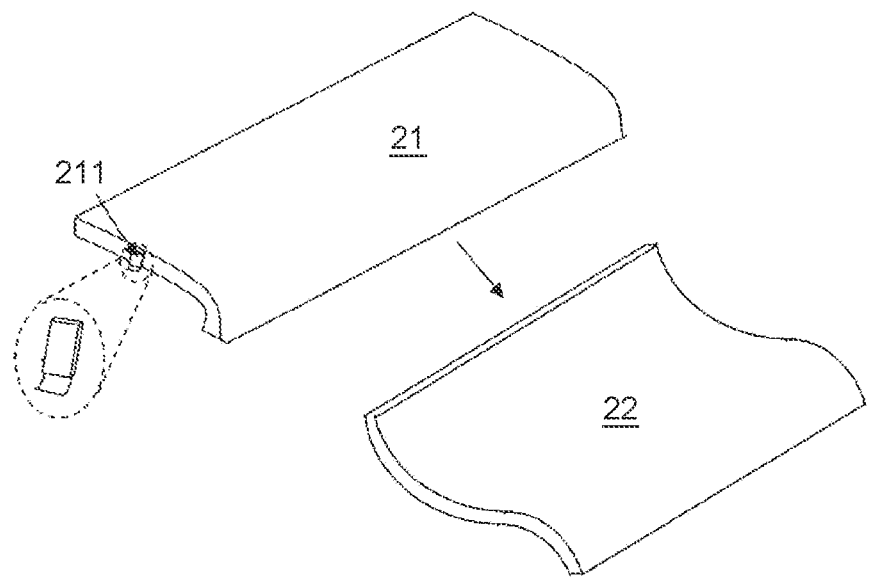
FIG. 11. shows an exemplary assembling for the pork chop mold center body and top body in accordance with the principles of the present disclosure.

The mold 20, as shown in FIG. 7, comprises a main body 23, a center body 22 and a top body 21. Basically, the main body 23 is configured to provide a porck chop shape comprises an opening, as shown in FIG. 8A and 8B, and serves as the base for the mold 20.

Further a top section 21, in combination with center body 22, is provided to close the opening of the main body 23. The top body 21 and center body 22 are configured to cover the opening of the main body 23, while maintaining the shape of the pork chop, as shown in FIG. 9A through 10B.

Figure 12:
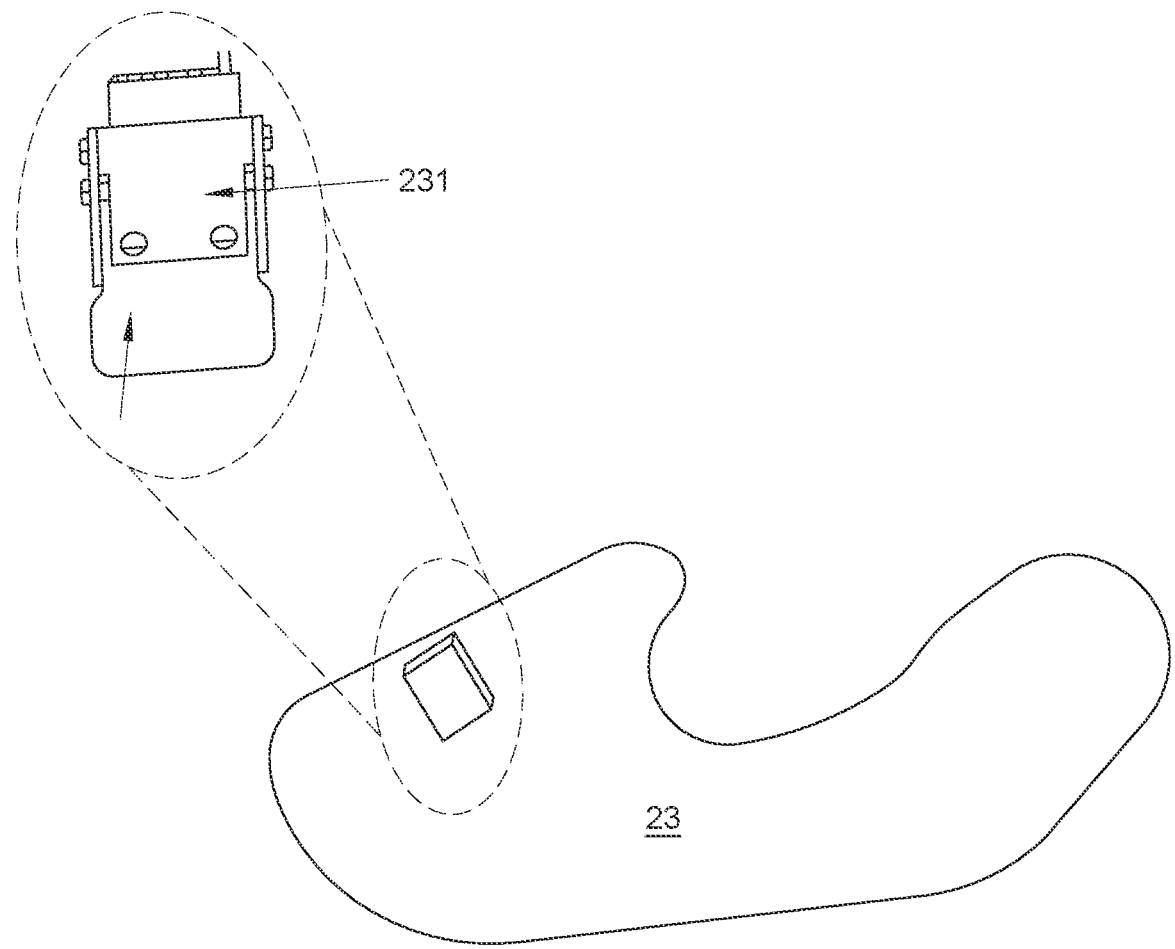
FIG. 12. shows an exploded view of the attachment mean for the pork chop mold main body and top body in accordance with the principles of the present disclosure.
Figure 14A:
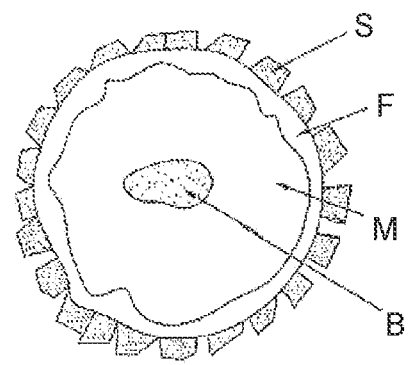
FIG. 14A-14D. shows a second exemplary embodiment of the pork chop product in accordance with the principles of the present disclosure.
Figure 13A:
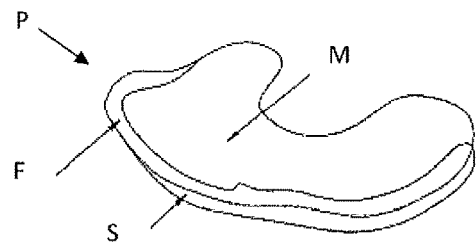
FIG. 13A-13F. shows a first exemplary embodiment of the pork chop product in accordance with the principles of the present disclosure.
Figure 13B:
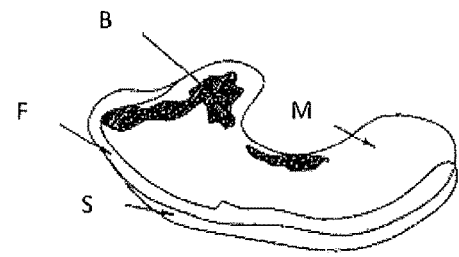
Figure 13C:
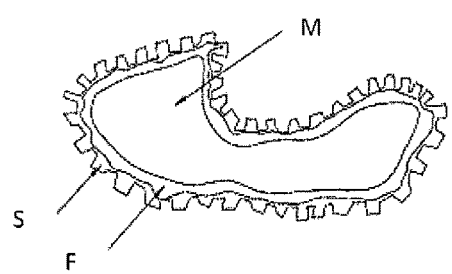
Figure 13D:
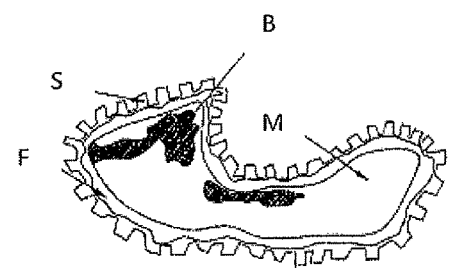
Figure 13E:
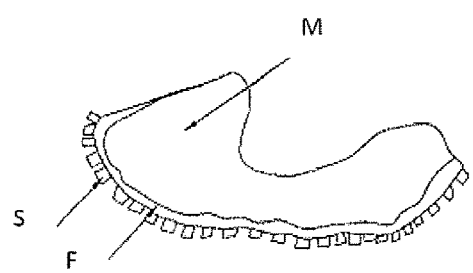
Figure 13F:
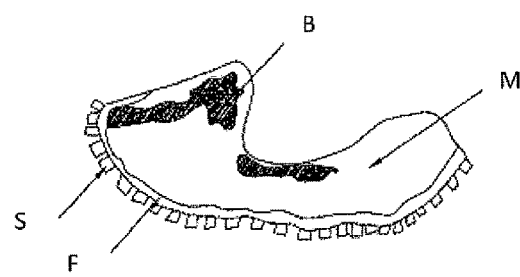
Figure 14B:
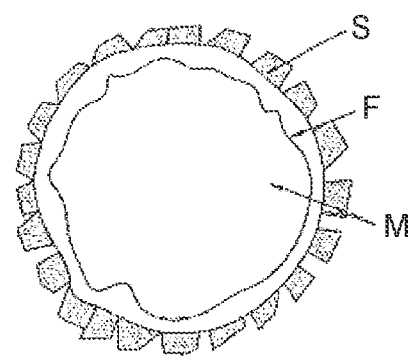
Figure 14C:
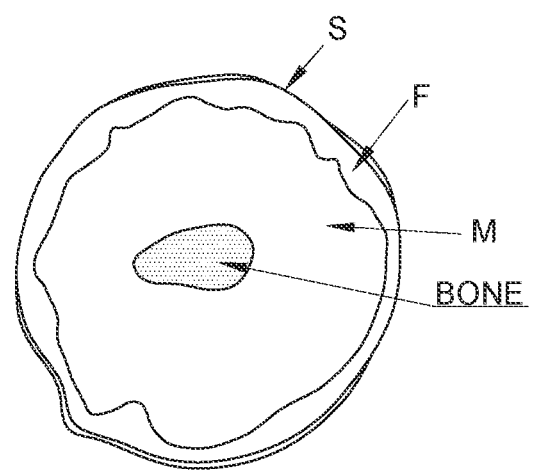
Figure 14D:
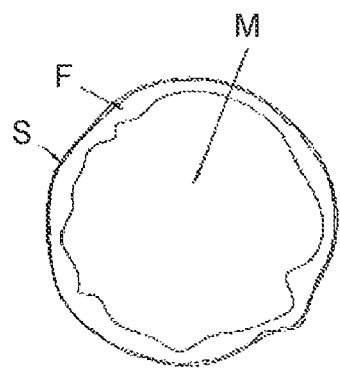

In order to close and seal the main body with the skin, bones, fat and meat inside the mold 20 the top body is positioned on top of the center body 22 in such way that , firmly hold the center body in position. Further attaching means 211 are connected with receiving means 231, as shown in FIG. 12. Once the top 21 and center body 22 are positioned closing the main body 23 opening the attaching and receiving means provide enough pressure to close and seal the skin, bones, fat and meat inside the mold 20. The mold is then chilled at a temperature in the range of 35 to 38 degrees Fahrenheit.

The result is a meat product P comprising skin, fat, bone and meat. FIG. 13A through 13F provide different configuration for a meat product P that mimics a pork chop comprising skin S, fat F, bone B and meat M in accordance with the present invention. FIG. 14A through 14F is more directed to a meat product that mimics rounded piece of meat. Adding bones or making the meat product P might depend on the clients specifications or preferences. Independently of the shape the flavor of the meat product is constant and provide substantially the same size, therefore the cooking time at the restaurant might be constant if cooking conditions are the same.

The exemplary embodiment, more particularly the meat product P, provide the use of a pork leg 1, however other animal parts can be used. Further, the process may be repeated independently from the type of prime material, such as meat, being used. For example the process is as follow:

1. Provide the prime material. In the instant case the prime material comprises any type of meat, fish, seafood, fruits, vegetables or any combination.
2. Removed bones when needed. The process to remove bone where previously describe. The use of an automatic machine reduces man power and time. It is important to understand the step to removed bones from meat can be completed for any part of an animal. The average temperature during this process is in the range of 32 to 33 degrees Fahrenheit.
3. Add flavor or marinate the prime material
4. Extract proteins. The skin and meat are exposed to the extraction of proteins individually or in combination. In the instant case proteins are removed by a vibration procedure which reduces the time for extracting proteins. The average temperature during the extraction of proteins is in the range of 34 to 35 degrees Fahrenheit.
5. Sealing the prime material within a hermetic enclosure or mold. The mold is configured to mimic or resemble a natural cut.
6. Chilling the enclosed prime material at a temperature in the range of 35 to 38 degrees Fahrenheit.
7. Cook prime material inside the mold. The meat is cook for approximately 2 hours as a temperature of 130 degrees Fahrenheit. Further the temperature is raised up to 150 degrees Fahrenheit for a period of approximately 2 hours. Again the temperature is raised up to 160 degrees Fahrenheit for a final period until the mold reaches an internal temperature of 140 degrees Fahrenheit.
8. Chill the cooked and molded prime material inside the mold. The prime material is cooled down for a period of 6 hour until reaching 33 degrees Fahrenheit. Further the molded prime material is cooled down for another 6 hours until reaching 0 degrees Fahrenheit. The temperature inside the mold starts at 140 degrees Fahrenheit and ends up at 0 degrees Fahrenheit.
9. Cut in slices. If the mold dimensions are big enough the molded prime material is divided into prime material slices for individual services.
10. The sliced prime material is packed or wrapped in plastic preferable in a vacuum space.

The disclosure is not limited to the precise configuration described above. While the disclosure has been described as having a preferred design, it is understood that many changes, modifications, variations and other uses and applications of the subject disclosure will, however, become apparent to those skilled in the art without materially departing from the novel teachings and advantages of this disclosure after considering this specification together with the accompanying drawings. Accordingly, all such changes, modifications, variations and other uses and applications which do not depart from the spirit and scope of the disclosure are deemed to be covered by this disclosure as defined in the following claims and their legal equivalents.

In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present disclosure, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

The invention claimed is:

1. A method o fabricating a meat product that mimics a boneless pork chop, sculpted from a pork leg, the method comprising:
   providing a raw pork leg;
   removing an aitch bone, a leg bone, a knee cap, a stifle joint, and a hind shank bone from said raw pork leg through a series of cuts in order to leave a single piece of de-boned raw pork leg musculature;
   injecting into portions of said single piece of de-boned raw pork leg musculature a flavored composition;
   subjecting said injected single piece of de-boned raw pork leg musculature to a vibration process at a temperature of no less than thirty-four degrees Fahrenheit and no more than thirty-five degrees Fahrenheit;
   sealing said vibrated single piece of de-boned raw pork leg musculature within a hermetic enclosure, said hermetic enclosure comprising an elongated shape and wherein said hermetic enclosure retains the single piece of de-bone raw pork leg musculature as a pork chop shape;
   chilling said hermetic enclosure containing said single piece of do-bone raw pork leg musculature to a temperature of no less than thirty-five degrees Fahrenheit and no more than thirty-eight degrees Fahrenheit;
   cooking said chilled single piece of de-boned raw pork leg musculature inside said hermetic enclosure to result in a cooked single musculature and
   chilling the hermetic enclosure containing said cooked single musculature.

2. The method of claim 1 further comprising:
   slicing said cooked single musculature into individual boneless pork chops.

* * * * *